March 2, 1943. L. DE FLOREZ ET AL 2,312,962
TRAINING APPARATUS FOR TEACHING RADIO NAVIGATION
Filed Aug. 28, 1940 2 Sheets-Sheet 1
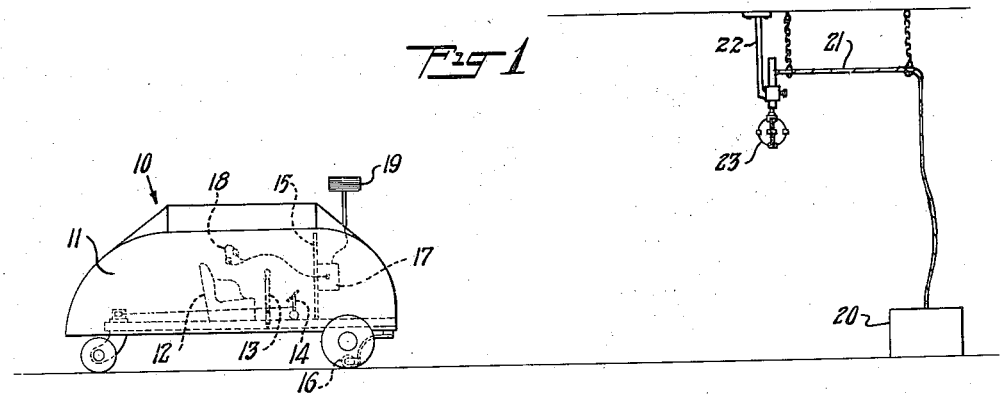
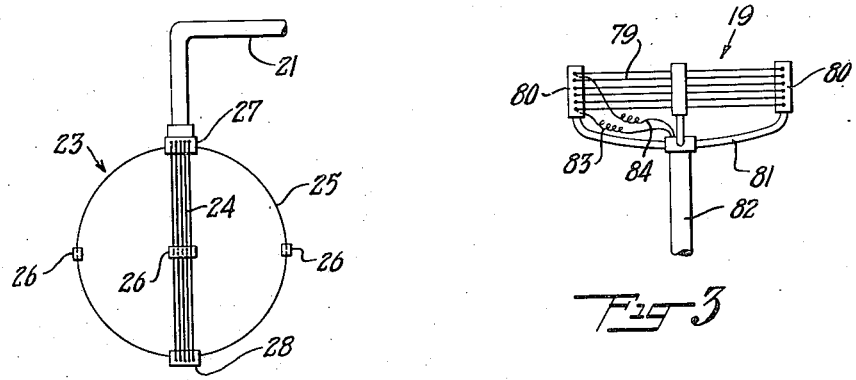
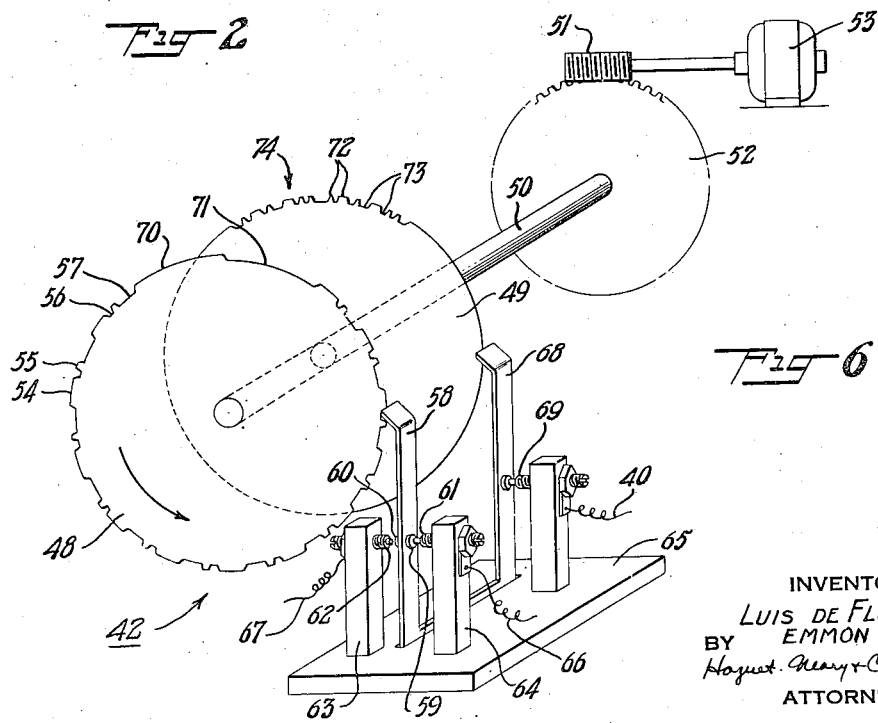
INVENTORS
LUIS DE FLOREZ
EMMON BACH
BY
ATTORNEY

INVENTORS
LUIS DE FLOREZ
BY  EMMON BACH
ATTORNEY

Patented Mar. 2, 1943

2,312,962

UNITED STATES PATENT OFFICE 2,312,962

TRAINING APPARATUS FOR TEACHING RADIO NAVIGATION

Luis de Florez, Pomfret, Conn., and Emmon Bach, Scarborough, N. Y.; said Bach assignor to said de Florez Application August 28, 1940, Serial No. 354,484

5 Claims. (Cl. 35—12)

This invention relates to devices for training students in the art of radio navigation, homing and tactics, and relates particularly to novel types of transmitters for simulating radio ranges and vehicles equipped with receivers by means of which practical problems in radio navigation, beam flying and tactics may be solved.

In teaching radio navigation and homing with the known type of ground school trainers, it is usual to simulate radio signals by means of telephonic communication. With such training devices, the instructor estimates the position and direction of movement of the trainer simulated by the manipulation of the controls of the trainer and sends signals which would correspond to the position of the aircraft with reference to a simulated radio range. It is a common tendency of the instructor under such circumstances to indicate to the student by the signals that he is "on course" and is coming into the cone of silence of the transmitter when he is only approximately on course. This results in the failure of the student to actually encounter some of the more difficult problems of radio navigation and beam flying, such as for example, that of flying off the beam when close to the home station, with the result that the cone of silence of the home station is completely missed; thus creating by this error in flying an entirely different but most important homing problem.

The present invention overcomes the deficiencies of the system discussed above, by providing a short range beam transmitting system which is used in conjunction with a vehicle in which the student rides and which can be maneuvered to simulate the movements of an airplane, ship, or land vehicle, such as a tank, so that problems in radio navigation, beam flying, tactics and the like, may be practiced under conditions substantially the same as those encountered in actual maneuvers.

More particularly, in accordance with the present invention there is provided a transmitter and a receiving system by means of which signals can be received in a vehicle which simulates the flight of an airplane. The transmitter preferably is portable, so that it may be moved from place to place in order to present new problems for solution by the student.

The transmitter may consist of a radio frequency oscillator and modulator therefor, a keying device and crossed inductances which may be suspended from any desired type of support or from the ceiling of a building with provisions for changing its height and orientation.

The receiving apparatus may be a radio receiver of a conventional type, which may be tuned to the transmitter frequency and is provided with a head set and a receiving inductance.

The transmitter, through the medium of its transmitting inductance which is very small in comparison with the wave length of the signals, sets up magnetic fields which energize the inductance of the receiver and are rendered audible in the head set. Transmission and reception by induction have the advantage that little or no interference with radio wave transmitters and receivers is created as well as permitting critical discrimination between the signals even at short ranges.

By means of the keying device the modulated impulse from the transmitter is fed to the transmitting inductances in such a manner as to produce the usual "N" (dash-dot) signal in one inductance and an "A" (dot-dash) signal in the other. These signals, when received with equal strength by the receiving set in the vehicle, result in a continuous note in the head set which is interrupted at intervals by the call letter of the simulated station. When the vehicle is off the beam the "N" or "A" signal will predominate or only one of these signals will be audible.

With systems of the type embodying the present invention, the signals exactly simulate those sent out by a conventional radio range so that the student can familiarize himself with the characteristics of such signals and, moreover, movement of the vehicle will cause the signals to change exactly as they would change if the student were piloting an airplane, ship or other vehicle on or off the beam of a radio range.

For a better understanding of the present invention, reference may be had to the accompanying drawings, in which:

Figure 1 is a view in elevation of a typical form of vehicle and transmitting station embodying the invention;

Fig. 2 is an enlarged view in elevation of a typical transmitting inductance;

Fig. 3 is a view in elevation of a typical form of receiving inductance;

Fig. 6 is a perspective view of a typical form of automatic keying device for use with the transmitting system.

Figure 4:
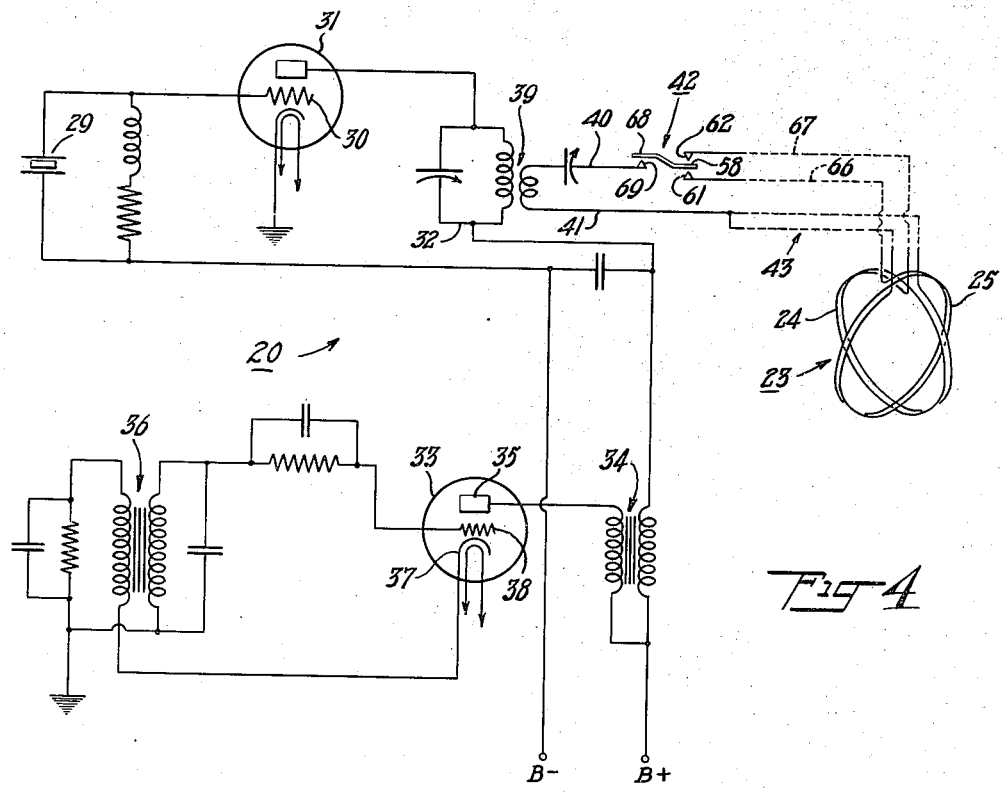
Fig. 4 is a wiring diagram of a typical form of transmitting system.
Figure 5:
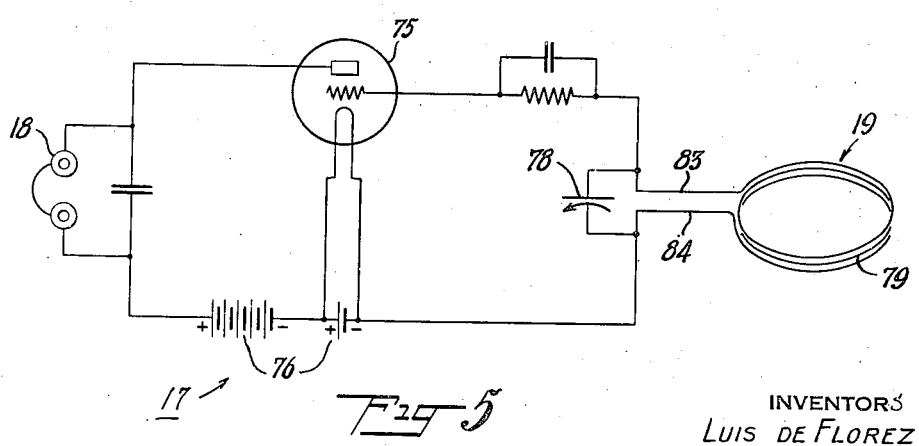
Fig. 5 is a wiring diagram of a typical form of receiver.

In accordance with the present invention, a typical form of training apparatus may include a wheeled vehicle 10 of the type more particularly described in the Luis de Florez application Serial No. 352,358, filed August 13, 1940. The vehicle 10 may consist of a body portion 11 which simulates the fuselage of an airplane and is provided with a seat 12 and various controls, such as the dummy control stick 13 and steering pedals 14 connected to the rear wheel. The vehicle is driven by a motor, not shown, for causing it to move at low speed as it is maneuvered by the student over an area which may simulate a terrain. This vehicle, preferably, is provided with an instrument panel 15 which may be provided with various instruments, such as a compass, rate of turn indicator, altimeter, rate of climb indicator, air speed indicator and the like (not shown), thus simulating the instrument panel of an airplane or other aircraft. The device, moreover, may be provided with a marking device 16, which consists of a roller which may be chalked or provided with other marking material for tracing the course followed by the vehicle 10 upon the area which is traversed.

In accordance with the present invention, the vehicle 10 is also provided with a receiver 17, of a type presently to be described, which is provided with the head phones 18 and a receiving inductance 19 which is mounted directly above the marking device 16.

The transmitting range system with which the vehicle 10 cooperates in order to solve problems in aerial navigation, beam flying and homing, may consist of a portable transmitting apparatus 20 which may be moved readily around the area in which the vehicle 10 travels.

In the form of transmitter illustrated, the transmitter 20 is provided with a cable 21 supported from the ceiling or other support, and connected to a transmitting inductance 23 suspended from the ceiling on a bracket 22 in such a way that the inductance 23 may be rotated or its elevation changed, as may be desired.

The inductance 23 may consist of two coils 24 and 25 formed of a plurality of turns of relatively heavy wire which are maintained in spaced apart relationship by means of insulating and spacing bars 26, as shown in Fig. 2. The top and the bottom turns of the coils may be received in the insulating blocks 27 and 28, which maintain the two coils in right angular relationship. The upper block 27 may be secured in any desired way to the end of the cable 21, containing non-radiating transmission lines which connect the coils 24 and 25 to the transmitter 20.

While the transmitting inductance coils 24 and 25 have been described as supported from the ceiling, it will be understood that they may, if desired, be supported in any other suitable way, preferably so as to permit them to be shifted from place to place and moved up and down.

Referring now to Figure 4, the transmitter itself may be of a conventional type including an oscillator crystal 29 which is interposed between the grid 30 of radio frequency oscillator tube 31 and the plate tank circuit 32 of the system. The transmitter may also include a modulator, such as for example, a 1000 cycle modulator, which includes an audio-frequency oscillator tube 33, a modulation transformer 34 connected to the plate 35 of the tube 33 and the lower end of the plate tank circuit 32, a feed back transformer 36 interposed between the filament 37 and the grid 38 of the tube and having its winding grounded, this arrangement being conventional.

The output inductance 39 of the plate tank circuit 32 is inductively coupled to the leads 40 and 41 which are connected by a keying device 42 and the non-radiating transmission lines 43 to the coils 24 and 25 of the transmitting inductance. The lead 41 is connected directly to one tap of each of the coils 24 and 25 while the lead 40 is connected through the keying device 42 to the other taps of the coils 24 and 25.

As shown in Figure 6, a suitable form of keying device 42 may consist of a pair of cams 48 and 49 which are fixed to a shaft 50. The shaft 50 is driven at low speed by means of a speed reduction drive such, for example, as a worm 51 and worm gear 52 and a motor 53. The major portion of the periphery of the cam 48 is provided with alternate relatively long projections 54, and smaller projections 55 with correspondingly shaped recesses therebetween. The elongated projections 54 simulate a dash, the shorter projections simulate a dot. Likewise, the shorter recesses 56 simulate dots and the longer recesses 57 simulate dashes. In order to convert these projections and recesses into signals, a contact blade 58 is provided which is urged against the periphery of the cam 48 and thereby follows its contours. The blade 58 is provided with contacts 59 and 60 on opposite sides thereof, which alternately engage with adjustable contact elements 61 and 62 that are mounted in insulating posts 63 and 64 on a suitable base 65. The contact 61 is connected by means of a transmission line 66 to the "N" (dash-dot) inductance coil 25 and the contact 62 is connected by means of transmission line 67 to one end of the "A" (dot-dash) inductance coil 24.

As the cam 48 is rotated, the contact blade 58 alternately engages the top of the projections 54 and 55 and the intermediate spaces 56 and 57. When the blade 58 successively engages the top of the projections 54 and 55 it will be forced against the contact 61, thereby energizing the inductance coil 25 and giving an "N" (dash-dot) signal. When the contact finger engages in the recesses, the contact 60 of the blade 58 will engage the contact 62, thereby energizing the "A" coil 24 and giving the "A" (dot-dash) signal. When the signals from the two coils 24 and 25 are received with equal intensity a continuous tone will be received because of the overlapping of the signals. Some slight keying click may be heard but this is not undesirable.

In radio range systems, it is usual to repeat the "A" and "N" signals and then send out the call letters of the station. In the present device the call letters of the system are caused to be transmitted by means of the second cam 49 which has a contact blade 68 engaging its periphery. The contact blade 68 is electrically connected to the contact blade 58. Normally the contact blade 68 is urged by the cam 49 into engagement with a contact 69, which is connected to the lead 40.

In order to alternately send the station call letters over the "A" coil 24 and the "N" coil 25, the cam 48 is provided with an elongated raised cam surface 70 and an elongated cam recess 71 adjacent thereto by means of which the blade 58 is brought alternately into engagement with the contacts 61 and 62. During these relatively long intervals when only one of the inductances is connected to the transmitter, the contact blade 68 is vibrated to send out a series of dots and dashes by means of the projections and recesses 72 and 73 along a sector 74 of the cam 49.

The projection 72 forces the contact finger 68 against the contact 69, thereby completing a circuit to one or the other of the transmitting coils 24 and 25, depending upon whether the blade 58 is engaging with the projection 70 or the recess 71. Engagement of the end of the blade 68 in a recess 73 on the cam 49 will break the circuit from the oscillator to the inductances, thereby interrupting the circuit and spacing the dots and dashes.

In operation, therefore, the keying device 42 will cause the transmitting coils 24 and 25 to transmit overlapping "A's" and "N's" for a predetermined period of time after which the call letters of the simulated station will be sent out alternately for equal periods by the coils 24 and 25. The "A" and "N" signals are then repeated.

Preferably, the combined length of the projection 70 and the recess 71 on the cam 48 exceeds the length of the sector 74 of the cam 49, which causes the station signal to be transmitted, the reason for this being that a more accurate timing is obtained by permitting the blade 68 to engage the contact 69 prior to the engagement of the blade 58 with the contact 61.

It has been found that a transmitter of this type including the crossed coils 24 and 25 sends out four right angularly related beams of about 3° width in which the overlapping "A" and "N" signals form a continuous note, thus permitting an accurate determination of direction. Moreover, such crossed coils have a zone of minimum intensity or a cone of silence in line with the line of intersection of the two crossed coils which is of a shape and character quite similar to the cone of silence directly above the crossed antennae of a radio range system.

In order to utilize the beams created by the crossed coils for practicing navigation and beam flying, the radio receiver 17 may be of a relatively simple type, consisting of a detector tube having its plate and filament voltages supplied by batteries 76 and which is provided with the head phone 18. The circuit may be tuned by a variable condensor 78 which is interposed between the grid and filament of the tube 75. The receiving inductance 19, as best shown in Figure 3, may consist of a coil 79 formed of a plurality of turns of wire, the ends of which are connected to the grid and filament of the tube 75 on opposite sides of the condensor 78. The loops of wire are maintained in spaced relationship by a plurality of insulating bars 80. These bars may be supported on a suitable spider 81, which is connected to a hollow standard 82 at the top of the vehicle and through which the lead-in wires 83 and 84 are lead to the receiver. It should be noted that the receiving inductance 19 is arranged with its axis vertical or perpendicular to the axes of the coils 24 and 25, which renders it selective and thereby permits it to discriminate between the signals transmitted by the individual coils 24 and 25 except when it is in the sectors directly between these coils or on the beam.

Through the medium of the signals received in the head set 18, the student is able to determine whether or not he is on the beam and, by the known types of navigation, to come onto the beam and home to the center of the cone of silence of the crossed coils 24 and 25.

From the foregoing description of this typical form of our invention, it will be apparent that we have provided a transmitting system which will transmit a beam pattern over an area sufficient for maneuvering with a slowly moving vehicle over a prolonged period of time and thereby permits problems in radio navigation, homing and tactics to be solved in the same manner as such problems are solved with regular aircraft, ships or the like on conventional radio ranges.

It will be understood, of course, that there may be many variations in the type of transmitter and receiving circuit inasmuch as many such circuits are entirely suitable for our purposes and that the receiving and transmitting inductance coils may be modified in size and in structure without departing from the invention. Therefore, the form of the invention described should be considered as illustrative only and not as limiting the scope of the following claims.

We claim:

1. A device for training students in radio navigation and homing, comprising a land vehicle having wheels thereon, a beam signal transmitter disposed exteriorly of said vehicle and free from connection therewith, means for moving and steering said vehicle relatively to said transmitter over a small area around said transmitter at a speed that is extremely low as compared with the speed of an aeroplane in flight, and a receiver in said vehicle for receiving said signals, said transmitter including means for emitting a quadrantal beam pattern of waves effectively over substantially said small area, only.

2. A training device, comprising a land vehicle having a seat, supporting wheels and means enclosing said seat to prevent an occupant thereof from viewing the surrounding area, means for moving said vehicle over a small area at speeds extremely low as compared with an aeroplane in flight, means for controlling the direction of movement and speed of said vehicle, a beam transmitter in said area exterior of and free from connection with said vehicle including an oscillator and a pair of crossed inductances for transmitting characteristic signals as magnetic fields over substantially said small area only, a receiver in said vehicle, and a receiving inductance on said vehicle for receiving selectively the signals transmitted by said beam transmitter.

3. A training device comprising a land vehicle having a seat, supporting wheels and means enclosing said seat to prevent an occupant thereof from viewing the surrounding area, means for moving said vehicle over a small area at a speed extremely low as compared with the speed of an aeroplane in flight, means for controlling the direction and speed of said vehicle, a portable transmitter in said area exterior of and free from connection with said vehicle including an oscillator and a pair of crossed inductance coils for transmitting characteristic signals as magnetic fields over substantially said small area only in a quadrantal beam pattern, a receiver in said vehicle and a receiving inductance on said vehicle having its axis perpendicular to the axes of said crossed inductances.

4. A training device for teaching radio navigation and homing comprising a land vehicle having a seat, supporting wheels, and a body enclosing said seat to prevent an occupant thereof from viewing the surrounding area, means for moving said vehicle over a small area at a speed extremely low as compared with the speed of an aeroplane in flight, means for controlling the speed and direction of movement of said vehicle, a transmitter in said area exterior of said vehicle and free from connection therewith having crossed inductance coils for creating interlocking magnetic fields to form a beam pattern effective over substantially said area only, a receiver in said vehicle and a receiving inductance coil connected to said receiver, said receiving coil being disposed with its axis parallel to the planes of said crossed inductance coils.

5. A training device for teaching radio navigation and homing, comprising a land vehicle having supporting wheels, means for moving said vehicle over a small area at a speed extremely low as compared with the speed of an aeroplane in flight, means for controlling the speed and direction of movement of said vehicle, a transmitter in said area exterior of said vehicle and free from connection therewith including crossed inductances and a keying device for causing said inductances to radiate a beam pattern of interlocked directive signals over substantially said small area only, a receiver in said vehicle for said signals, and a directive inductance for discriminating between said signals whereby said signals may be utilized to navigate said vehicle.

LUIS DE FLOREZ.
EMMON BACH.